United States Patent

[11] 3,578,146

| [72] | Inventor | James J. Mehlschau<br>Davis, Calif. |
|---|---|---|
| [21] | Appl. No. | 767,073 |
| [22] | Filed | Oct. 14, 1968 |
| [45] | Patented | May 11, 1971 |
| [73] | Assignee | The Regents of the University of California<br>Berkeley, Calif. |

[54] FILLER FOR BINS
6 Claims, 5 Drawing Figs.

[52] U.S. Cl.................................................. 198/121,
214/17
[51] Int. Cl...................................................... B65g 65/30
[50] Field of Search........................................... 214/17.62
(Inquired); 198/91, 121, 122, 99; 53/56
(Inquired), 58—59 (Inquired)

[56] References Cited
UNITED STATES PATENTS

| 2,889,676 | 6/1959 | Griffith........................ | 53/59X |
| 3,147,846 | 9/1964 | Huntoon...................... | 198/122X |
| 3,254,755 | 6/1966 | O'Brien ...................... | 214/17X(62) |

*Primary Examiner*—Edward A. Sroka
*Attorney*—Lothrop & West

ABSTRACT: A filler for bins has a supply conveyor with a stationary initial portion and an end portion movable on said stationary portion to lift and lower in a bin in response to a jack controlled by either of two sensing panels on the margins of a deflector frame, hanging as a pendulum from said conveyor end portion, to lift said end portion when one of said sensing panels is abutted by produce in said bin.

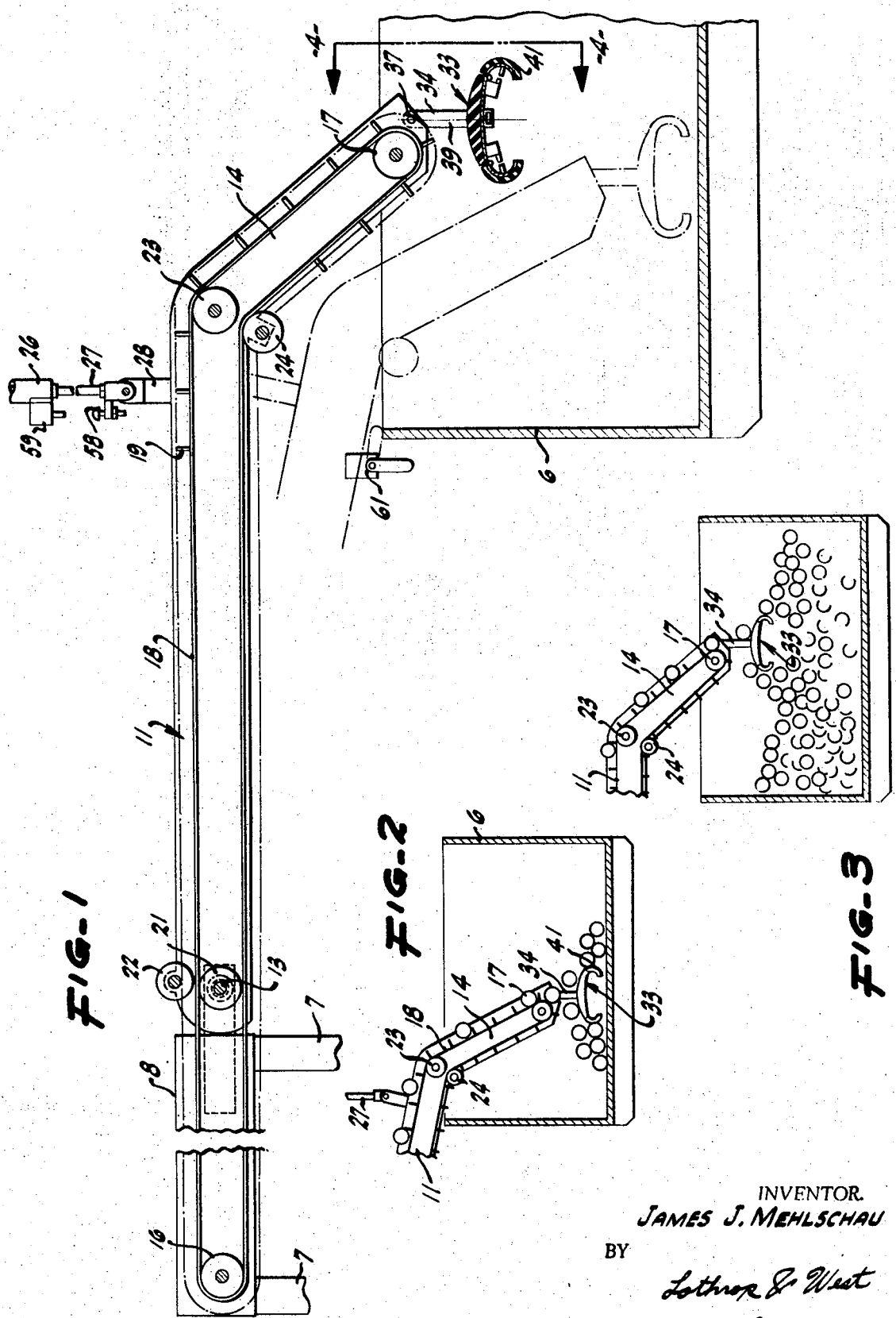

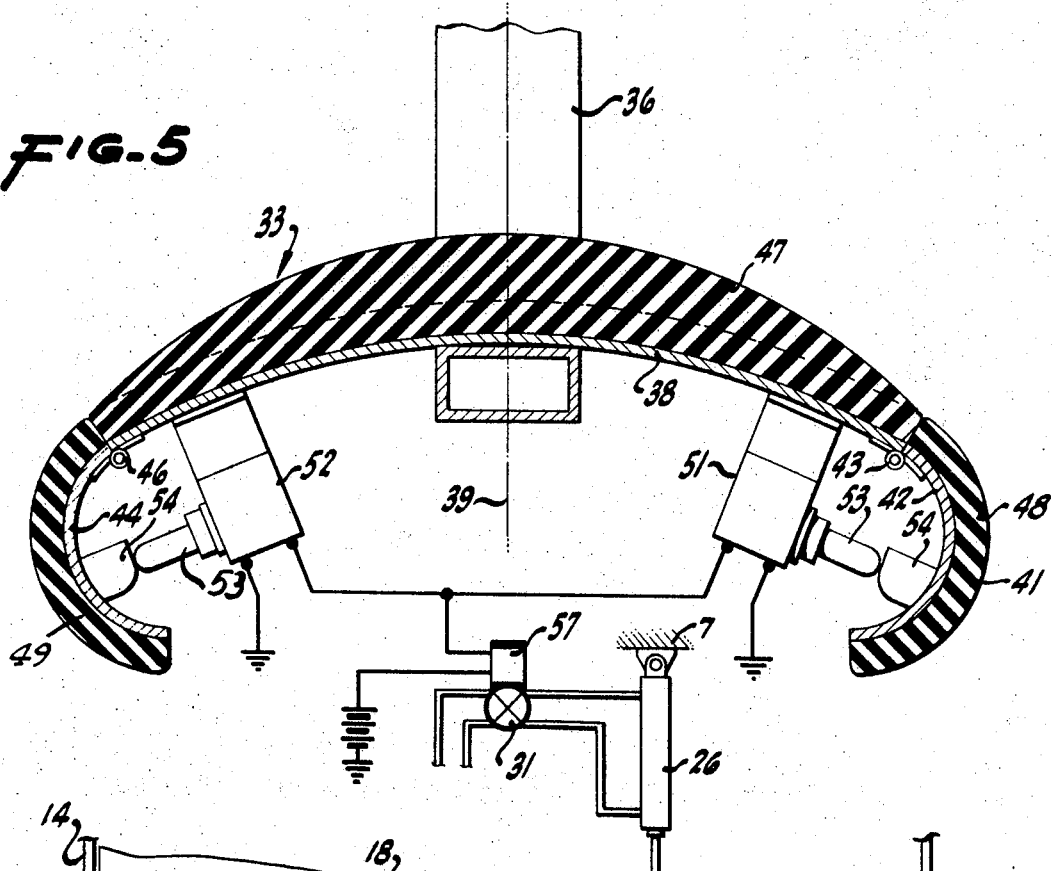
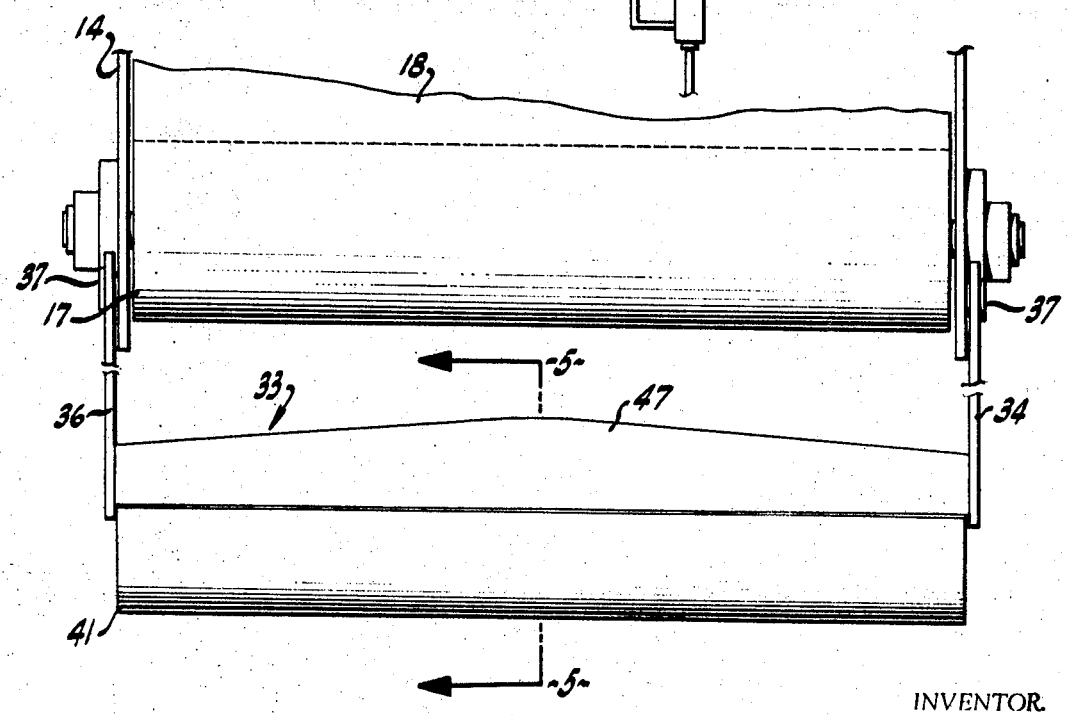

FILLER FOR BINS

In many agricultural harvesting operations it is customary to gather the produce, such as fruit, and to deposit the gathered produce in a relatively large bin which can be handled by a forklift tractor or the like. In recent years bins are made of relatively large size, being several feet from top to bottom. Often the harvested produce is simply dumped into the bin, thereby undergoing a fall of several feet. To some produce this is quite damaging and reduces its grade and usefulness.

It is therefore an object of my invention to provide a filler for bins which conducts the fruit into the bin so that the discharged produce enters the bin or is received in the bin with little or no fall and thus little or no damage.

Another object of the invention is to provide a filler for bins which will automatically position itself so as to take into account the level of produce already in the bin.

Another object of the invention is to provide a filler for bins that affords an even distribution of the produce in the bin.

Another object of the invention is to provide a filler for bins in which produce at any particular height in the bin is effective to control the position of the filler conveyor.

Another object of the invention is in general to provide a filler for bins effective for use in connection with harvesting or picking machines.

Another object of the invention is in general to provide an improved filler for pins.

A filler for bins pursuant to the present invention is especially useful in the environment provided by the "Hedgerow Picking Machine" disclosed in the copending application of Robert B. Fridley, Ser. No. 767,207 filed Oct. 14, 1968 and assigned to the assignee of the present invention.

In that environment there is provided a vehicle which advances between the rows of trees or bushes from which the produce is taken and which conveys the picked produce to a central conveyor. Although there are other environments in which the present filler for bins is equally useful, it is convenient for disclosure purposes to refer to the above-identified application. In that application there is a complete disclosure of a hedgerow picking machine and some disclosure in simplified form of the structure herein. Presently, the filler for bins is described in the accompanying description and is illustrated in the accompanying drawings, in which:

FIG. 1 is a cross section on a vertical longitudinal plane through a filler for bins pursuant to the invention and as it is adapted for use in the hedgerow picking machine above identified;

FIG. 2 is a diagram at reduced scale showing the filler for bins in position near the bottom of a produce bin;

FIG. 3 is a view similar to FIG. 2 but showing the filler for bins approaching the top of a produce bin;

FIG. 4 is an end elevation to an enlarged scale, the view being taken as indicated by the line 4-4 of FIG. 1; and FIG. 5 is a cross section, the plane of which is indicated by the line 5-5 of FIG. 4.

The filler for bins is primarily, although not exclusively, for use in connection with a presently standard produce bin 6 as used in connection with the picking or harvesting of fruit such as pears or peaches, for example. The bin 6 is supported on a suitable frame, not shown, which also supports a picker framework 7 having a conveyor thereon including a relatively stationary initial portion 8 and a relatively movable final portion 11. A cross pivot shaft 13 connects the vertically movable portion 11 to the stationary portion 8.

Near its outboard or free end the movable portion 11 has an outwardly and downwardly directed frame extension 14. Designed to operate around rollers 16 on the stationary portion 8 and rollers 17 on the movable portion 11 is a conveyor belt 18 of flexible material preferably having upstanding flights 19 at intervals thereon. The belt is arranged to pass over an idler roller 21 concentric with the pivot axis 13 and also to be confined by a pair of marginal guide rollers 22 on the movable frame 11.

Similarly, at the knee of the movable portion 11 the upper run of the conveyor travels over a roller 23 mounted therein. Idlers 24 at each side of the frame of the portion 11 ensure that the lower or return run of the conveyor belt is appropriately guided. With this arrangement, part of the belt is movable with the end portion 11 in a vertical plane and in an up-and-down or lifting and lowering direction about the axis 13.

The motion of the conveyor portion 11 is produced and the end portion is also supported by a hydraulic cylinder and piston mechanism 26 mounted on the frame 7 (see FIG. 5). The relatively movable piston rod 27 is connected to a yoke 28 joined to the opposite sides of the movable conveyor frame. The hydraulic cylinder 26 is connected to a hydraulic fluid source or sink through a valve 31. Depending upon the position of the valve, the piston rod 27 either remains stationary in load-supporting position within the cylinder 26 or the piston rod rises in the cylinder and lifts the movable conveyor portion with it or falls and lowers the movable conveyor portion with it. In this fashion the conveyor end portion is positioned at a height controlled by the hydraulic cylinder 26.

Mounted on the movable end portion of the conveyor and preferably near the extremity thereof is a deflector frame 33. This includes a pair of suspension straps 34 and 36 at the opposite ends thereof. At their lower ends the straps are substantially fixed to the frame 33, but at their upper ends they are mounted by pivot connections 37 to the frame 11. The deflector frame thus hangs by gravity and can swing as a pendulum, being quite free to hang vertically when the movable conveyor end portion is lifted and lowered in an arc about the pivot axis 13 as a center. The frame 33 is also free to shift longitudinally if unequally pressed by adjacent produce.

The deflector frame 33 is preferably provided with an upwardly convex, central plate 38 having its center almost exactly below the path of discharge of produce on the upper run of the conveyor 18 and rounding the lower roller 17. Produce released by the endmost flight as it turns around the roller 17 is inclined to hit close to the centerline 39 of the deflector plate 38. The distance of fall is slight so that no damage is incurred and always with about the same angle of incidence, so that the fruit or produce is deflected with equal ease to the right or to the left (in FIGS. 1-3).

Extending along one of the transverse marginal edges of the deflector frame is a marginal panel 41 preferably inclusive of a curved plate 42 connected by a transversely extending, horizontal hinge 43 to the plate 38. Along the opposite, transverse marginal edge of the plate 38 there is a similar marginal panel 44 connected thereto by a hinge 46. It is preferred that the plates 38, 42 and 44 all be covered with a yielding material such as sponge rubber pads 47, 48 and 49 so that contact with the produce will be soft and gentle.

Mounted beneath and connected to the plate 38 are similar electrical circuit closers 51 and 52. Each closer can include a spring-pressed plunger 53 in the path of a lug 54 on the adjacent plate. When the plate is swung inwardly about the hinge 43, the electrical switch 51 is actuated. A similar action occurs with the switch 52 and the plate 44. The switches are electrically connected to a solenoid operator 57 controlling the valve 31 in a sense to cause the piston rod to be lifted within the cylinder 26 whenever either closer completes the circuit. For greater sensitivity and to eliminate the effect of spring pressure, the plungers 53 can be conductors fixed in their closers and the lugs 54 can be grounded conductors fixed on the plates 42 and 44. Then only a light abutment is sufficient to close the circuit and actuate the piston rod.

In the operation of this device, produce such as fruit is advanced along the upper run of the conveyor belt 18 from left to right as seen in FIG. 1. Initially, the cylinder 26 is so disposed as to permit the piston rod 27 to be projected a maximum amount. The free or discharge end of the conveyor then occupies a lower pivoted position, as shown in the broken line in FIG. 1, with the deflector plate quite close to the bottom of the bin 6. As the produce advances to the extreme end of the movable conveyor, as shown in FIG. 2, it is then deposited gently onto the central pad 47 near the center thereof. The produce then travels either forwardly or rearwardly approximately at random and rolls or discharges with only a slight, noninjurious drop onto the bottom of the bin 6. As the fruit or produce gathers in the bin, it piles up. Eventually some of the fruit abuts the cover pad 48 on the plate 42 or the cover pad 49 on the plate 44. Since these plates are substantially pendulums themselves and are quite free-swinging, either one is readily deflected by a light abutment of the gathered fruit against it. Whichever of the plates is deflected causes actuation of its adjacent circuit closer 51 or 52 to actuate the valve 31. Sufficient hydraulic fluid is then admitted beneath the piston to lift the outer end of the conveyor a small amount. The conveyor lifts until the marginal panels are no longer abutted by the fruit. The plates 42 and 44 are free to swing by gravity away from circuit-closing position, whereupon the lifting motion stops. In time, additional fruit builds up higher within the bin and again some pieces abut either of the marginal panels and again cause actuation of the hydraulic cylinder further to lift the conveyor end. Eventually the conveyor end rises out of the bin entirely when the bin is full. This final lifting movement may be utilized to move an actuator 58 against a switch 59 to cause a discharge mechanism to advance the bin 6 out from under the conveyor and to permit the introduction of any empty new bin thereunder, all as described in the above-identified companion application.

With this mechanism the filler for bins is effective very gently to deposit the produce or fruit into a subjacent bin and to rise step by step and gradually as the bin is filled so that the incoming fruit always falls through only a very short distance. The filler is effective as a distributor hanging and moving as a pendulum and despite the arcuate movement of the conveyor end directing the fruit or produce almost exactly evenly between the fore portion and the rear portion of the bin. Finally, the filler is effectively lifted entirely out of the bin when the bin is full so that the filled bin can advance toward discharge from beneath the conveyor end and so that a new, empty bin can come into position.

Either a manual operation of the switch 59, or of a similar switch, or an automatically controlled switch 61 actuated by the arrival of the empty new bin operates the valve 31 so that the cylinder 26 lowers the piston rod 27 and repositions the conveyor end in its lowermost position ready to start a new cycle.

I claim:

1. A filler for bins comprising a supply conveyor having an end portion, means for moving said conveyor end portion into and out of a bin, a produce deflector frame depending from said end and having a pair of edge portions, a pair of sensing devices, means for movably attaching each of said sensing devices to each of said edges portions to depend therefrom substantially as a pendulum and in position on said deflector frame to be moved by abutting produce in said bin, and means responsive to pivotal movement of said sensing means for actuating said moving means to move said conveyor end portion out of said bin.

2. A filler for bins as in claim 1 in which said produce deflector frame is pivoted to hang as a pendulum from said conveyor end portion.

3. A filler for bins as in claim 1 in which each of said sensing devices includes a marginal panel hingedly mounted along one edge of said deflector frame.

4. A filler for bins as in claim 3 in which said deflector frame includes means forming an upper surface sloping downwardly in opposite directions from the center toward said marginal panel along one edge and toward a duplicate of said marginal panel along the other edge.

5. A filler for bins as in claim 3 in which an electrical switch controlling said moving means is mounted on said deflector frame in position to be actuated by said marginal panel when moved.

6. A filler for bins as in claim 1 in which said supply conveyor has a relatively stationary initial portion and a relatively movable end portion pivoted about a horizontal axis to said relatively stationary initial portion.